United States Patent [19]
Floyd

[11] Patent Number: 5,684,637
[45] Date of Patent: Nov. 4, 1997

[54] FLUID FILLED AND PRESSURIZED LENS WITH FLEXIBLE OPTICAL BOUNDARY HAVING VARIABLE FOCAL LENGTH

[76] Inventor: Johnnie E. Floyd, 3606 Spotted Horse Trail, Austin, Tex. 78739

[21] Appl. No.: 503,995

[22] Filed: Jul. 19, 1995

[51] Int. Cl.[6] ............................................. G02B 1/06
[52] U.S. Cl. ............................................................. 359/666
[58] Field of Search ....................................... 359/666, 667, 359/665

[56] References Cited

U.S. PATENT DOCUMENTS

| | | | |
|---|---|---|---|
| 6,901 | 1/1849 | Katuoka | 359/666 |
| 1,269,422 | 6/1918 | Gordon . | |
| 2,576,581 | 11/1951 | Edwards | 88/41 |
| 2,836,101 | 5/1958 | De Swart | 88/57 |
| 3,031,928 | 5/1962 | Kopito | 88/74 |
| 3,161,718 | 12/1964 | De Luca | 88/57 |
| 3,598,479 | 8/1971 | Wright | 351/159 |
| 4,174,156 | 11/1979 | Glorieux | 351/168 |
| 4,181,408 | 1/1980 | Senders | 351/159 |
| 4,261,655 | 4/1981 | Honigsbaum | 351/41 |
| 4,444,471 | 4/1984 | Ford, Jr. | 350/423 |
| 4,466,706 | 8/1984 | Lamothe, II | 350/419 |
| 4,477,158 | 10/1984 | Pollock | 351/169 |
| 4,732,458 | 3/1988 | Zambelli | 359/667 |

OTHER PUBLICATIONS

"Optics Liquid Lens", Popular Science, May 1994, p. 36.
"Liquid Lens . . . " The Surveyors vol. 3, No. 4, (1967) p. 26.
Edwards, "Variable Curvature Fluid Lens" IBM Tech. Dis. Bulletin vol. 24, No. 1B Jun. 1981, p. 572.

Primary Examiner—David P. Porta
Assistant Examiner—Richard Hanig
Attorney, Agent, or Firm—Geoffrey A. Mantooth

[57] ABSTRACT

A flexible boundary fluid lens cell is disclosed. The fluid lens cell has a membrane edge retention arrangement which retains flexible lens membranes so the membranes may freely change slope about the membrane edge portions in response to varying fluid pressure within the lens cell, thereby precluding optical aberrations due to fixed membrane boundaries. The edge portions are clamped between lips in a frame an a ring that is interposed between two membranes. The flexible boundary fluid lens cell is particularly useful in eyewear to compensate for the eye's loss of accommodation. Eyewear incorporating the flexible boundary fluid lens cell are capable of continuously variable focal power so that the lens may be adjusted to focus on objects at varying distances. In addition, certain systems and system components are disclosed for application of the lens cell to eyewear.

32 Claims, 12 Drawing Sheets

FLUID FILLED AND PRESSURIZED LENS WITH FLEXIBLE OPTICAL BOUNDARY HAVING VARIABLE FOCAL LENGTH

FIELD OF THE INVENTION

The present invention relates to variable focal length lenses, and in particular to a fluid filled lens having a flexible optical membrane or surface boundary, the optical properties of which can be controlled by the pressure of the fluid within the boundaries. The curvature of the optical surface boundaries of the lenses so formed can be adjusted and controlled at will. The pressure within the boundaries is the pressure difference across the optical surface boundary.

BACKGROUND OF THE INVENTION

Adjustable optical surface curvature lenses having variable focal length are known in the prior art. Eyewear lenses are one application for which variable focal length lenses can be used.

Such variable focal length lenses are particularly useful for compensation of loss of accommodation of the human eye. Loss of accommodation is the loss of the ability to adjust the focal length of the eye to view objects at varying distances. Typically, bifocal and trifocal ground lenses have been used to compensate for the loss of accommodation. However, such ground lenses provide compensation only at specific fixed object distances, such that objects located between the two fixed distances of a bifocal lens (or the three fixed distances of a trifocal lens) still require some human eye accommodation in order for the user to focus on that object.

One type of adjustable curvature lens is a fluid filled and pressurized flexible optical membrane or surface boundary variable focal length lens. Fluid filled and pressurized variable focal length lenses can compensate for loss of accommodation by providing a lens that can focus on objects at any distance. In a fluid filled and pressurized variable focal length lens, typically two elastomeric optical surface forming membranes are held in alignment at their peripheries and the cavity therebetween is filled with a transparent refractive fluid. The pressure of the fluid within the cavity causes deformation of the membranes, which in turn causes a change in the shape of the refractive fluid boundaries, which in turn causes variations in the focal length of the lens. Therefore, fluid filled and pressurized variable focal length lenses provide an advantage over ground lenses, and provide focus on objects at any distance.

Fluid filled and pressurized variable focal length lenses offered by others, however, suffer optical aberrations due to:

1) The optical surface forming membrane itself, and
2) The support constraints introduced around the edge portions of the membrane.

Regarding optical aberrations due to the membrane itself; the optical aberrations originate with the thickness profile (cross-sectional thickness from edge to edge) of the membrane. A membrane made of a flat plate cannot form a spherical surface when deformed by fluid pressure. This is true even with a simple support around the edge of the membrane. My invention solves this problem by changing the thickness profile from the center of the membrane to the edge. The thickness profile does not have a constant thickness as with a flat membrane, but instead has a reduction in thickness as a function in distance from the center as defined by the most advantageous curve, typically and simplistically a conic section.

Regarding optical aberrations due to the support constraints around the membrane, edge moments induced by other approaches cause bending of the membrane to shapes not purely dependent on the fluid pressure. In some cases, edge slope is fixed, often at zero slope (that is, the membrane edge does not bend). Thus, as the center of the membrane flexes due to fluid pressure, the membrane edges are restrained and are unable to form spherical shapes as required in spherical optics. The prior art retaining arrangements subject the membrane edge to retarding edge moments so that the edges do not flex to form an advantageous optical shape. The optical aberrations caused by the fixed and restrained membrane edges work to limit the effective field of view of the fluid filled and pressurized variable focal length lens, reducing the usefulness of the lens substantially. Ideally, the elastic lens elements of a fluid filled and pressurized variable curvature focal length lens should assume a spherical shape upon pressurization and subsequent deformation in response to fluid presence within the cavity of the lens.

Another source of optical aberrations in a fluid filled variable focus lens is the presence of a contaminating fluid inside of the lens. Such a contaminating fluid has different optical properties than the refractive fluid that is used to deform the membranes and pass light therethrough. For example, with the refractive fluid being a liquid, the contaminating fluid could be a gas, such as air. Air bubbles have different optical properties than the refractive liquid, thereby causing optical aberrations to occur in the lens. Air can enter a lens in a variety of ways. For example, air can enter during the assembly of the lens.

SUMMARY OF THE INVENTION

Therefore, it is an object of the present invention to provide a fluid pressure variable lens wherein the edge deformation of a lens element is minimized.

It is a further object of the present invention to provide fluid pressure variable lens eyewear capable of providing a continuum of focal powers that have a large field of view unimpeded by optical aberrations.

It is a further object of the present invention to provide a flexible membrane having a non-flat cross-sectional thickness profile in order to provide a more spherical lens.

It is a further object of the present invention to provide a mechanism for removing contaminating fluid, such as air, from the interior of a fluid filled lens without disassembling the lens.

The present invention provides a lens cell that includes two transparent membranes, with each of said membranes having an edge portion that extends around a periphery of the respective membrane. Each of the edge portions has an interior portion and an exterior portion. At least one of the membranes is flexible. There is a ring located between the interior portions of the edge portions of the membranes. The ring extends around the peripheries of the membranes such that the membranes are spaced apart and form a cavity therebetween. The cavity is filled with a transparent fluid. There is a frame that has a channel located therein. The membrane edge portions are located within the channel. The channel has a lip that is adjacent to the exterior portion of the flexible membrane edge portion. The lip has an inside surface that is spaced apart from an end surface of the ring so as to form a gap. The edge portion of the flexible membrane is clamped between the lip inside surface and the ring end surface, wherein the edge portion of the flexible membrane pivots freely between the lip and ring as the flexible membrane flexes due to changes in the fluid volume in the cavity.

The present invention provides an arrangement for retaining the edge portions of a flexible membrane in a fluid filled cell, while allowing the edge portions to freely pivot during flexure of the flexible membrane. The edge portions of each flexible membrane are clamped between two circumferentially directed pivot features, one on each side of the membrane edge portion. As fluid is pumped in or out of the cavity, the flexible membrane flexes to form either a positive lens (wherein the membrane bows out) or a negative lens (wherein the membrane bows in). The flexure of the neutral axis of the flexed membrane is in a spherical shape. When the flexible membrane flexes in either direction, the edge portions freely pivot between the clamping lip and ring.

The retaining arrangement for the membrane edge portions produces no edge moment on the edge portions. Thus, as the center portion of the membrane flexes, the edge portions also flex in the same direction and the slope at the edge portion is equal to the slope of the center portion adjacent to the edge portion. This arrangement minimizes optical distortions around the edges of a flexed membrane, which distortions would otherwise be created with fixed edges. By minimizing the optical distortions around the edges of a lens cell, the field of view of the lens is greatly increased.

In accordance with one aspect of the present invention, there is a seal that is interposed between the ting end surface and the membrane edge portion. In accordance with another aspect of the present invention, the seal has a projection that contacts the ting end surface. In another aspect, there is also provided a second projection that is interposed between the lip and the membrane edge portion.

The flexible membrane can have a circular periphery, or it may have a non-circular periphery to correct for astigmatism or to provide other desirable optical properties. The astigmatic correction contains a null at zero slope and varies as the difference in slopes along the major and minor axes. The flexible membrane may be transparent and clear, or it may be tinted. The flexible membrane may be polarized so as to reduce the passage of unpolarized light therethrough. Furthermore, the flexible membrane may be made of a material that darkens when subject to intense light. The fluid inside of the lens can be colored.

In another aspect of the present invention, the ring has a port located therein. The port communicates with a reservoir for the fluid and also communicates with the cavity. In one aspect of the present invention, the reservoir includes a piston that is located within a cylinder. The cylinder, cylinder head, and piston form a reservoir for the fluid. In accordance with another aspect of the present invention, there is provided a motor for rotating a nut, translating a screw and operating a piston, and in another aspect there is provided a motor for rotating a screw, translating a nut and operating a piston. In accordance with still another aspect of the present invention, the reservoir includes a flexible tube. The lens also includes a roller that is in contact with a flexible tube. The tube and the roller form a peristaltic pump. The roller is moveable along the length of the tube.

In accordance with another aspect of the present invention, the flexible membrane has a cross-sectional thickness profile between first and second surfaces, with the first surface being parabolic in shape, wherein the deflected shape forms spherical shapes of the fluid with the membranes' influence on the light rays passing therethrough being ignored (thin membrane) or the deflected shape of the fluid and the membranes form a combination shape that minimizes spherical aberration (thick membrane).

In accordance with still another aspect of the present invention, there is provided a bias valve having an interior portion and an exterior portion. The interior portion communicates with the fluid in the reservoir and the exterior portion communicating with an exterior of the lens cell. The reservoir comprises first and second channels, with each of the first and second channels having first and second ends. The first end of each of the first and second channels is connected to the lens cell so as to allow communication between the first and second channels and the cell cavity. The second end of the first channel communicates with the second end of the second channel. The first channel has a first one way valve that allows the fluid to flow from the first channel first end to the first channel second end. The second channel has a second one-way valve that allows the fluid to flow from the second channel second end to the second channel first end.

There is also provided a method of changing optical properties of a fluid filled lens cell. The cell includes at least one flexible membrane with an edge portion; the membrane forms a boundary to a cavity. A channel is provided for fluid from one location of the cavity to a location that is outside of the cell and then to another location of the cavity. A one-way valve is provided in the channel. The amount of the fluid in the channel and the cell is changed by adding or removing the fluid from the channel, wherein the flexible membrane flexes in response to the fluid change.

In one aspect of the method of the present invention, the step of changing the mount of the fluid in the channel and the cell by adding or removing the fluid from the channel, further includes the step of inserting a hollow needle into the channel and adding or removing the fluid from the channel through the needle.

In another aspect of the method, the step of changing the amount of the fluid in the channel and the cell by adding or removing the fluid from the channel, further includes the step of removing gas from the channel.

BRIEF DESCRIPTION OF THE DRAWINGS

FIG. 2A is a cross-sectional detail view of the fluid lens cell in accordance with another embodiment, wherein a positive, rotatable lens element is utilized.

FIG. 2B is a cross-sectional detail view of the fluid lens cell in accordance with mother embodiment, wherein a negative rotatable lens element is utilized.

FIG. 8A is an alternate embodiment of the piston pumping mechanism of FIG. 8.

DESCRIPTION OF PREFERRED EMBODIMENT

Figure 1:
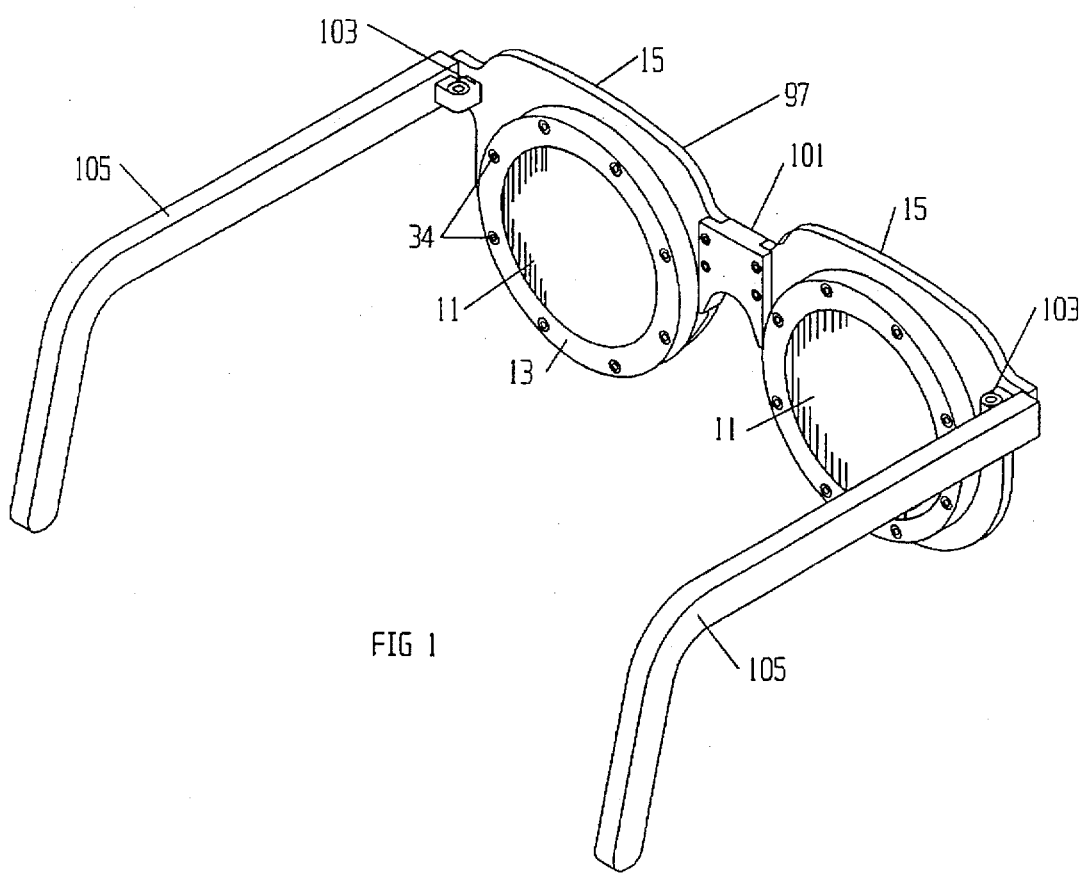
FIG. 1 is an isometric view of a pair of eyewear incorporating the fluid lens cells of the present invention, in accordance with a preferred embodiment.
Figure 1A:
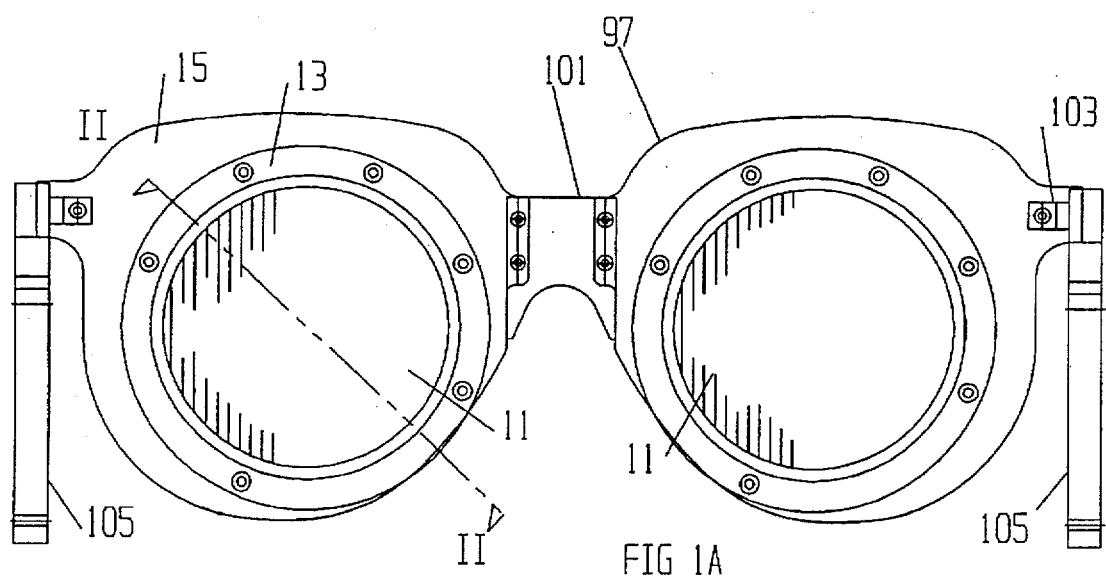
FIG. 1A is a rear view of the eyewear of FIG. 1.

In FIGS. 1 and 1A, there is shown a pair of eyewear 97 incorporating the lens cells 11 of the present invention, in accordance with a preferred embodiment. The eyewear 97 includes two inner shells 13, and two outer shells 15. Each lens cell 11 has an inner shell 13 and an outer shell 15. The shells are sufficiently rigid to provide structural support for the lens cells 11.

The pair of eyewear 97 has two lens cells 11, one for each eye of a human wearer. In the preferred embodiment shown in FIG. 1, the inner and especially the outer shells 13, 15 form part of the eyewear frame. Each outer shell 15 is shown as a flat plate. Alternatively, the outer shells can be curved to provide aesthetic appeal. The outer shell can be curved as in a sphere or any axisymmetric continuous curve of revolution where the pole has zero slope. Each inner shell 13 may be flanged, as shown, or unfledged, and configured to encompass the periphery of the respective lens 11. The outer shells 15 are coupled together by a nose bridge 101. An earpiece 105 is attached to each outer shell by a hinge 103. Thus, the eyewear frame is made up of the shells 13, 15, the nose bridge 101 and the earpieces 105.

Although the flexible boundary fluid lens cell 11 is of particular use in forming eyewear capable of focusing on objects at all distances, the cell 11 is not limited to use in eyewear and may be used as a variable focus lens in many applications such as cameras, telescopes, binoculars, etc.

Figure 2:
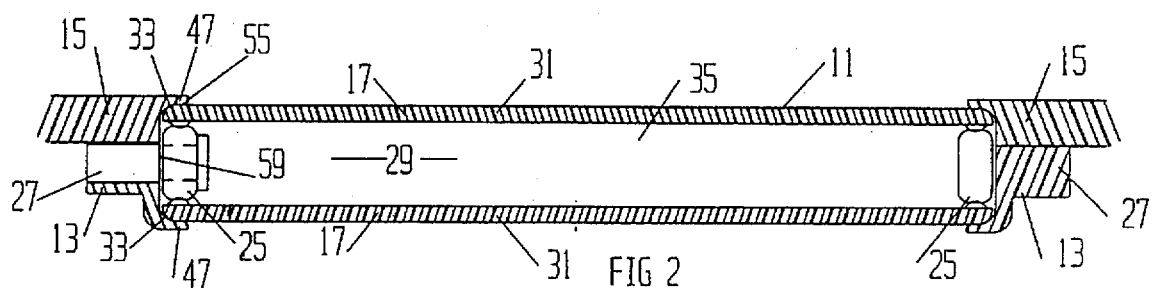
FIG. 2 is a cross-sectional detail view of the fluid lens cell in a planar lens formation taken along lines II—II of FIG. 1A.
Figure 11:
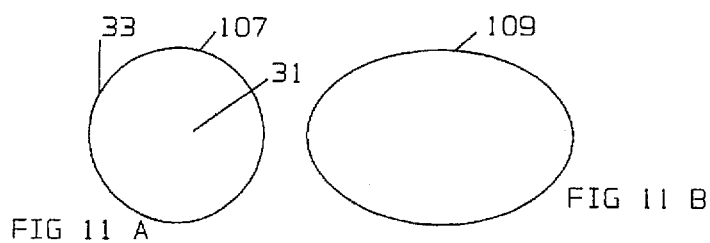
FIGS. 11A–11K show peripheral shapes that the fluid lens cell membranes may assume.
Figure 11:
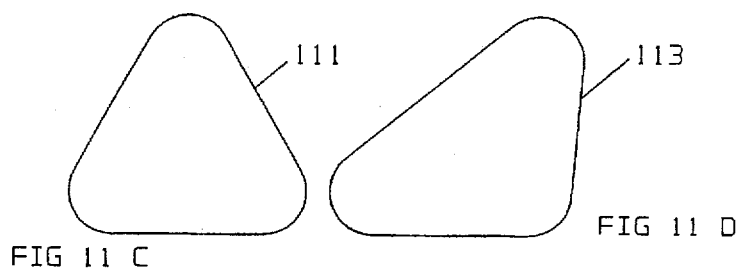
Figure 11:
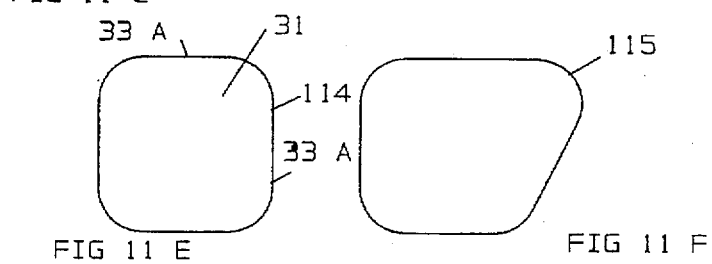
Figure 11:
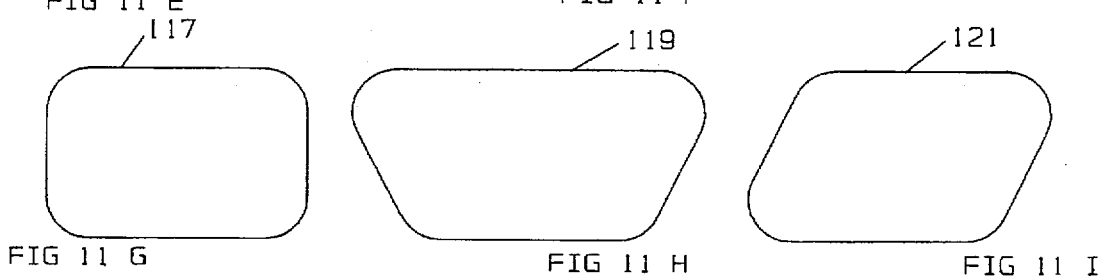
Figure 11:
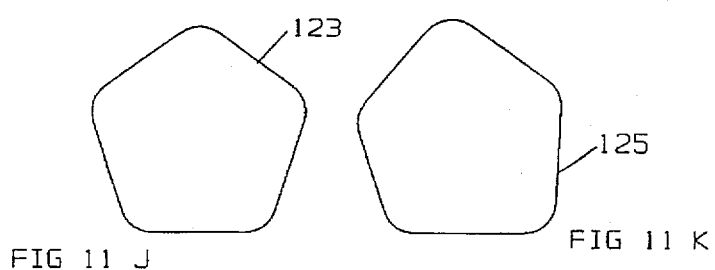

Referring to FIG. 2, each lens cell 11 has at least one flexible and transparent membrane 17. The second membrane may be rigid and must be transparent. In the preferred embodiment, each lens cell 11 has two flexible membranes 17. Each membrane 17 has a central portion 31 and an edge portion 33 that extends around the periphery of the membrane (see FIG. 11A). (A membrane in the shape of a polygon, such as is shown in FIG. 11E, may have not one edge portion, but plural edge portions 33A, one for each side of the polygon.) Each membrane has a seal 21 (see FIG. 5). Each lens cell 11 has a ring 25 for providing a space or separation between the membranes 17. The ring 25 extends all around the edge portion 33 of the membrane 17. Thus, a sealed chamber 35 is formed between the membranes 17 and the ring 25. The chamber is filled with fluid 29.

The inner and outer shells 13, 15 encompass the lens cell 11 along the edge portions 33 of the respective membranes 17. The inner and outer shells 13, 15 are coupled together. In a preferred embodiment, fasteners 34 (see FIG. 1) couple the inner shell 13 to the outer shell 15. The fasteners 34 do not contact the membranes 17. The shells 13, 15 are proportioned to present a relatively rigid restraint for retaining the membranes 17 under the forces of the operating fluid pressures.

The focusing elements of the fluid lens cell 11 are formed by the transparent membranes 17 and a transparent refractive fluid 29 contained between the membranes 17. The edge of each membrane 17 is spaced apart from the edge of the other membrane 19 by the ring 25.

The fluid 29 can be removed from or added to the chamber 35 of each lens cell 11 so as to focus images over a range of object distances without optical aberrations.

Figure 3:
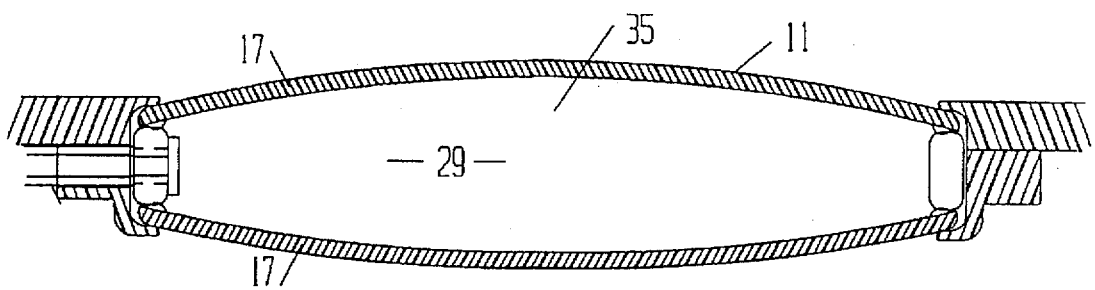
FIG. 3 is a cross-sectional detail view of the fluid lens cell of the present invention in a positive lens formation.
Figure 4:
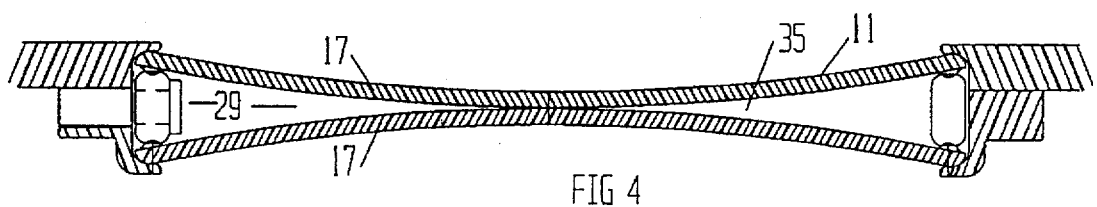
FIG. 4 is a cross-sectional detail view of the fluid lens cell in a negative lens formation.
Figure 2:
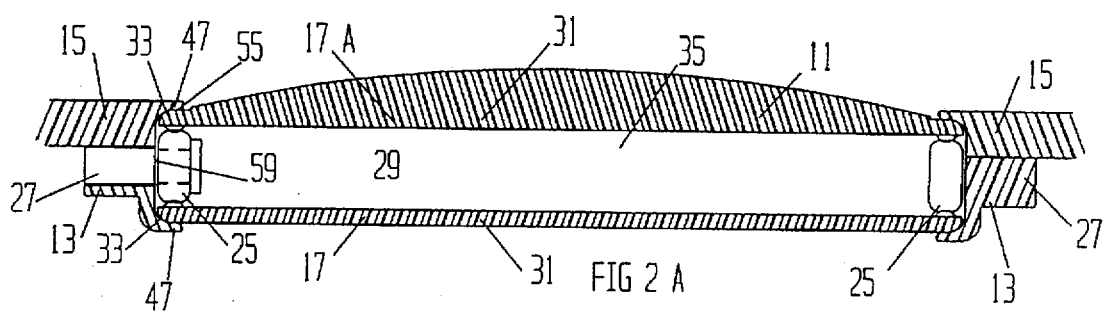
Figure 2:
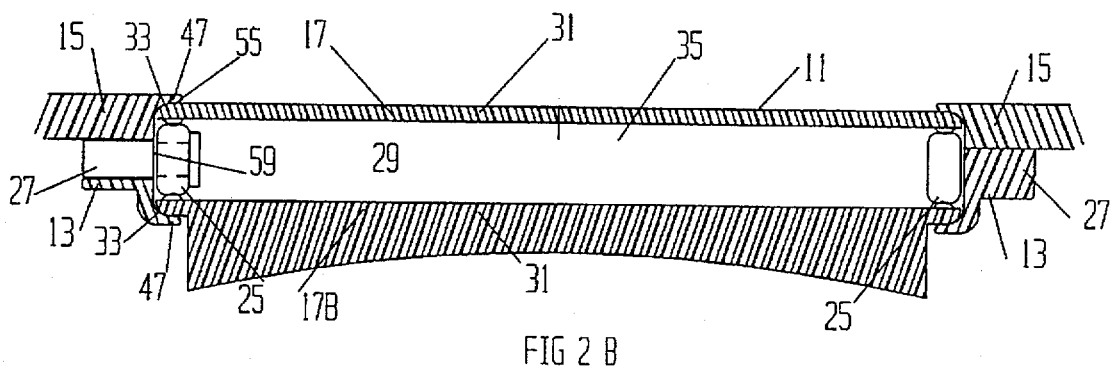

The focus of the lens cell 11 may be altered by changing the volume of the fluid 29 in the chamber 35. The fluid 29 may be added to or removed from the chamber through one or more tubes 27, which extend through the ring 25. The flexing of the membranes 17 requires the fluid to be pressurized relative to the external environment. The membranes 17 are formed of a transparent flexible material capable of deflecting outward and inward (FIGS. 2–4) depending on the fluid pressure and volume within the chamber 35. A planar, or undeflected neutral axis, lens is formed when the pressure of the fluid 29 within the chamber 35 equals the external environmental or atmospheric pressure surrounding the cell 11. This condition causes no deflection, either outward or inward, of the membranes 17 (FIG. 2). When the volume of the fluid 29 in the chamber 35 is increased from what is shown in FIG. 2, then the flexible membranes 17 deflect axially outward (the center portions 31 of the two membranes deflect away from each other), forming a positive lens (FIG. 3). When the volume of the fluid 29 in the chamber 35 is decreased from what is shown in FIG. 2, then the membranes 17 deflect axially inward (the center portions 31 of the two membranes deflect toward each other), forming a negative lens (FIG. 4). The curvature of the membranes 17 and the focal power of the lens 11 are capable of extending continuously over the range of strongly negative to strongly positive lenses as a function of the volume of the fluid 29 within the chamber 35.

The edge portions 33 of the membranes 17 are retained in the inner and outer shells 15, 17 so as to allow the edge portions to freely change slope in conjunction with the center 31 of the membranes while preventing the edge portions 33 from grossly moving either axially or radially.

The membrane edge retention arrangement of the present invention enables the fluid lens cell 11 to provide an aberration-free large field of view through the membranes 17 while maintaining the membranes 17 in a fluid-tight sealed relation. The freedom of all portions (central portion 31 and edge portion 33) of the membrane to change slope reduces optical aberrations. Therefore, boundary deflections typically found in fixed edge boundary fluid lens cells are precluded and focal aberrations caused by edge boundary moments which have an effect over the entire flexible lens membranes are eliminated. Preclusion of edge boundary moments by the membrane edge retention arrangement extends the undistorted field of view encompassed by the lens cell 11.

Thus, when a membrane 17 is flexed to provide a desired optical characteristic (for example, the positive lens shown in FIG. 3), not only does the flexed center 31 of the membrane provide this optical characteristic, but the edge portion 33 also provides this same optical characteristic. The useful area of the lens is thus increased from just the center 31 to the edge portion 33. This is because the edge portion 33 is free to flex.

Figure 5:
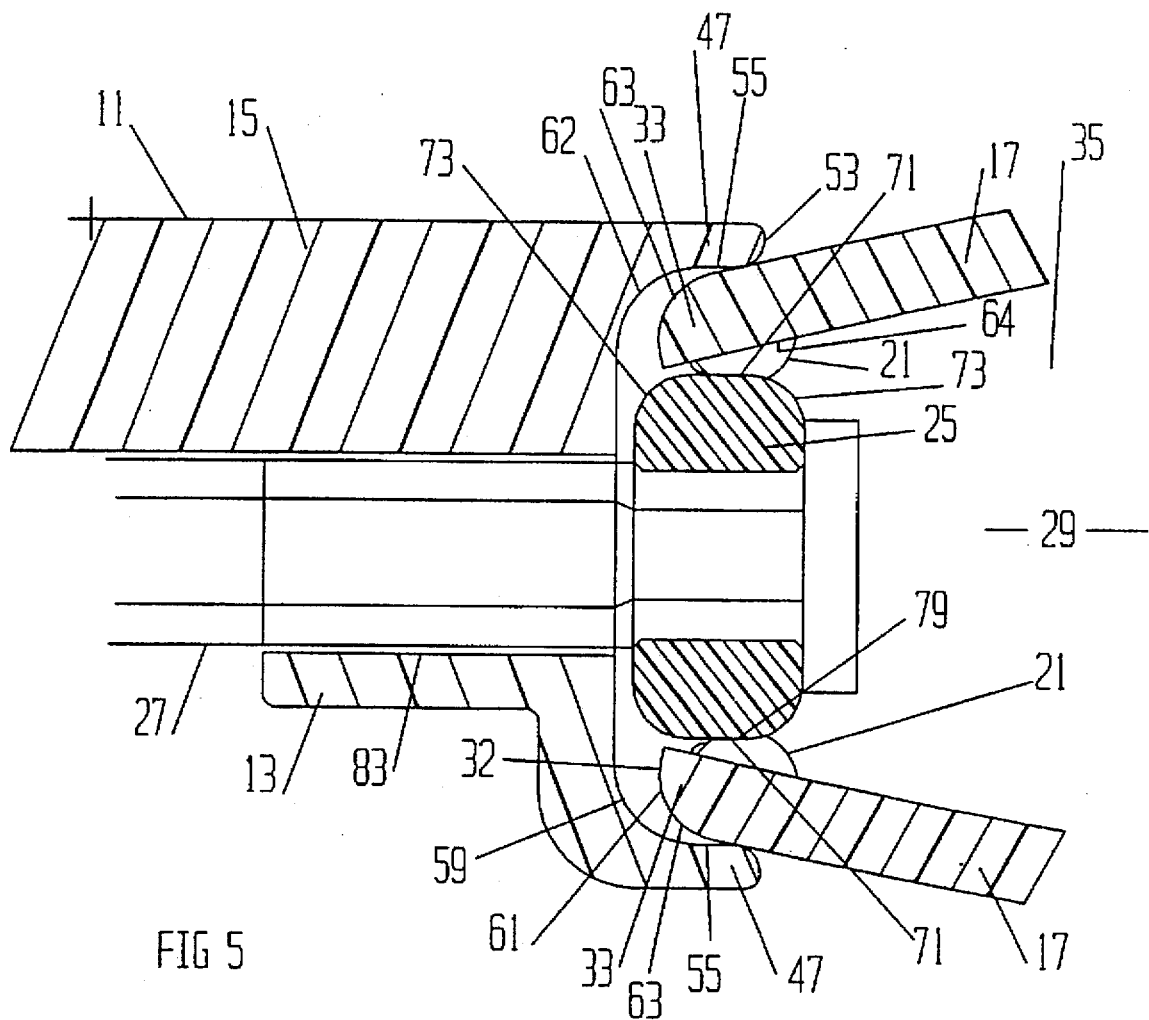
FIG. 5 is a close up cross-sectional view of the membrane edge retention arrangement shown in FIG. 3.

Referring to FIG. 5, the edge portions 33 of the membranes 17 are mounted between the shells 13, 15 and the ring 25. The inner and outer shells 13, 15, each have a lip 47. Each lip 47 has an inner face 55. A groove 59 is formed between the lips 47 of the shells 13, 15. The edge portions 33 of the membranes 17, the seals 21 and the ring 25 are located within the groove 59. The seals 21, the ring 25, and the lips 47 all extend around the edge portion 33 of each membrane 17.

The inner face 55 of each lip 47 contacts an outer surface 63 of each membrane 17. The outer edge corner 61 of each membrane 17 is rounded. The groove 59 has corners 62 located at the base of the lips, which corners are rounded to avoid interference with the rounded edge corners 61 of the membranes. Each lip 47 has a rounded end 53 that merges with the lip inner surface 55. Thus, the edge portion 33 of each membrane may freely change slope without interference from the lip 47. The lip inner surface 55 prevents axial and radial translational movement by the membrane 17 but allows the edge portion 33 to change slope as the deflection of the membrane 17 changes in response to fluid pressure within the chamber 35.

The ring 25 is located centrally within the groove 59 formed by the shells 13, 15. The ring 25, in conjunction with the seals 21, 23, renders the cell 11 fluid-tight, while allowing the lens membranes 17 to deflect freely. The ring 25 is generally rectangular in cross-section, as shown in FIG. 5. The ring 25 has end surfaces 71 which face the membranes 17. The end surfaces 71 form a fluid-tight contact with the seals 21 which are coupled to the membranes 17. The corners 73 of the ring 25 are rounded so that the seals 21 and membrane end portions 33 may pivot about the end surfaces 71 of the ring 25 in response to deflections in the membranes 17, maintaining a fluid-tight seal between the ring 25 and the seals 21 while allowing the membranes 17 to deflect freely. The ring 25 is formed of a rigid plastic.

The seals 21 are rounded to enhance the pivoting action of the seals 21 on the end surfaces 71 of the ring 25. The seals 21 are formed of a pliable, compressible material so the interior face 79 of each seal 21 is slightly compressed against the respective end surface 71 of the ring 25. The slightly compressed seals 21 form a fluid-tight seal between the ring 25 and the membranes 17 that allows the membranes 17 to deflect freely in response to fluid pressure within the chamber 35. When the membranes 17 deflect outward and inward in response to a change in fluid pressure within the chamber 35 each seal 21 pivots on the end surface 71 of the ring 25, allowing the membranes 17 to deflect axially while preventing the membranes 17 from axial or radial translational motion.

The seals 21 are preferably formed in place and by nature of the materials chosen. The seals are attached by adherence to the inner surface 64 of the membranes 17 at the edge portions 33. The seal 21 and the membrane 17 are subsequently located in the groove 59 between the ring 25 and the shells 13, 15.

The edge portion 33 of each membrane 17 is fixed as to translation within the lens cell 11, being clamped by the lips 47 and by the ring 25. The lips 47 and the ring 25 cooperatively provide pivot points about which the edge portions 33 of the membranes 17 may pivot. The pivot points are inset slightly from the edges 32 of the membranes 17 so that the edge portions 33 of the membranes 17 are free to pivot in response to deflection of the membranes 17. The compression of the membrane edge portions 33 by the lips 47 and the ring 25 is enough to prevent radial and axial translational movement of the membranes, but being insufficient to affect axial rotational movement of the membranes 17. This allows the lens membranes 17 to deflect over a large range of lens focal powers with corresponding edge boundary deflections. As shown in FIG. 3, the membranes 17 may deflect outwardly, wherein the edge portions 33 pivot (change slope) about the lips and the ring 25. The rounded outer end 53 of each lip 47 does not interfere with the outward pivoting movement of the membrane outer surface 63. Nor does the rounded corner 73 of the ring 25 interfere with the inward movement of the edge 32 of the membrane 17. As shown in FIG. 4, the membranes may deflect inwardly, wherein the edge portions pivot about the lips and the ring 25. The rounded corner 62 of each lip 47 and channel 59 does not interfere with the outward movement of the membrane edge 32. Nor does the rounded corner 73 of the ring interfere with the inward movement of the inner surface 64 of the membrane.

To assemble a cell 11 (see FIG. 2)., an outer shell 15 is obtained. A membrane 17 is placed inside of the outer shell so that the edge portion 33 contacts the lip 47. The seal 21 (see FIG. 5) on the membrane 17 is facing away from the outer shell lip 47. The ring 25 is installed so as to contact the seal. The tube or tubes 27 are installed in the ring before the ring is installed in the outer shell 15. Next, another membrane 17 is installed so that its seal 21 contacts the ring 25. Finally, the inner shell is installed so that its lip 47 contacts the edge 33 of the membrane (the bottom membrane in FIG. 5). A channel 83 is provided in one or both of the shells 13, 15 for the tube 27. The inner shell 13 is secured to the outer shell 15 by fasteners 34 by fastening with adhesion or by welding (such as ultrasonic welding).

Figure 6:
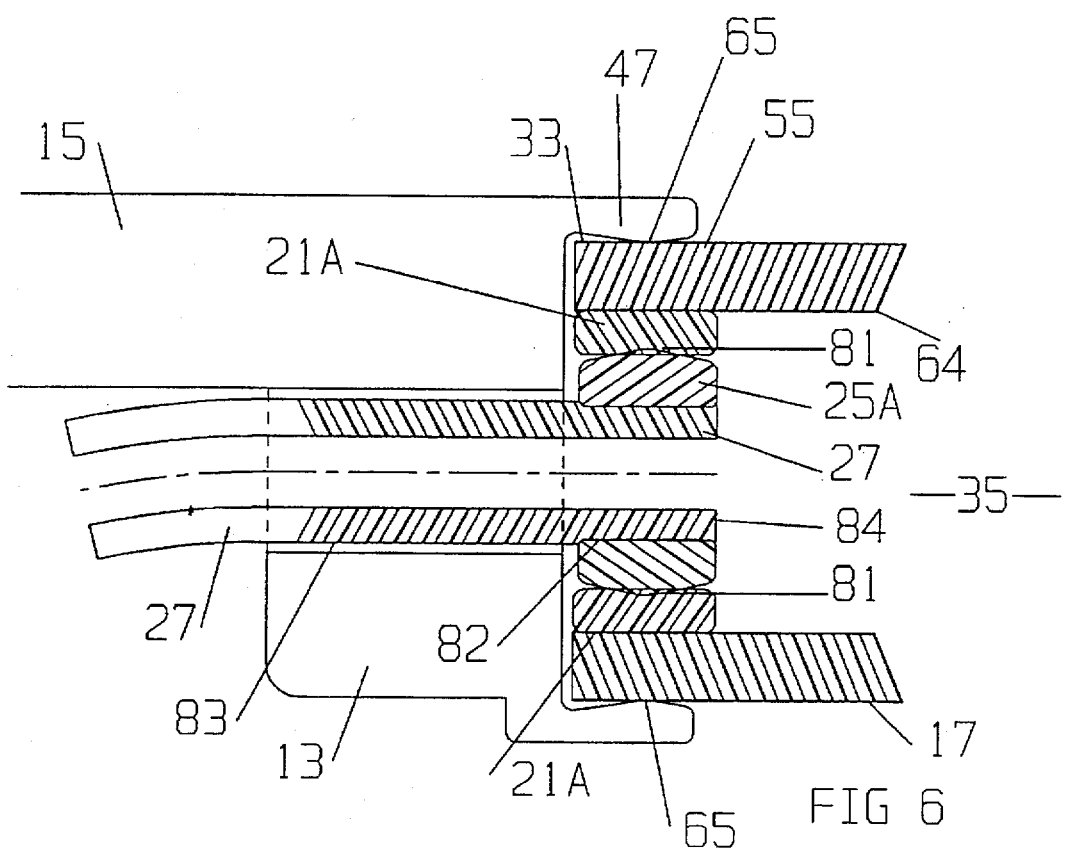
FIG. 6 is a close up cross-sectional view of the membrane edge retention arrangement in accordance with another embodiment.

FIG. 5 shows one embodiment of the sealing arrangement about the membrane edge portion 33. In FIG. 6, there is shown another embodiment of the sealing arrangement. In this embodiment, the seals 21A are rectangular in cross-section, instead of being rounded. The seals are coupled to the inside surface 64 of the edge portion 33 of the membranes 17. Manufacture of rectangular seals is simple. The ring 25A is provided on each of its end surfaces with a central projection 81 that contacts the seals 21A. The interior surface 55 of each lip 47 has a similar projection 65. Thus, each membrane 17 is clamped but can move freely in slope between the projections 65 and 81. As each membrane moves in slope, the beveling of each lip interior surface, provided by the projection 65, and the beveling of each end projection 81 of the ring 25A, provides clearance so as not to interfere with the sloping movement of the edge portions. Thus, as the membranes flex, no bending moments are applied to the edge portions.

Figure 7:
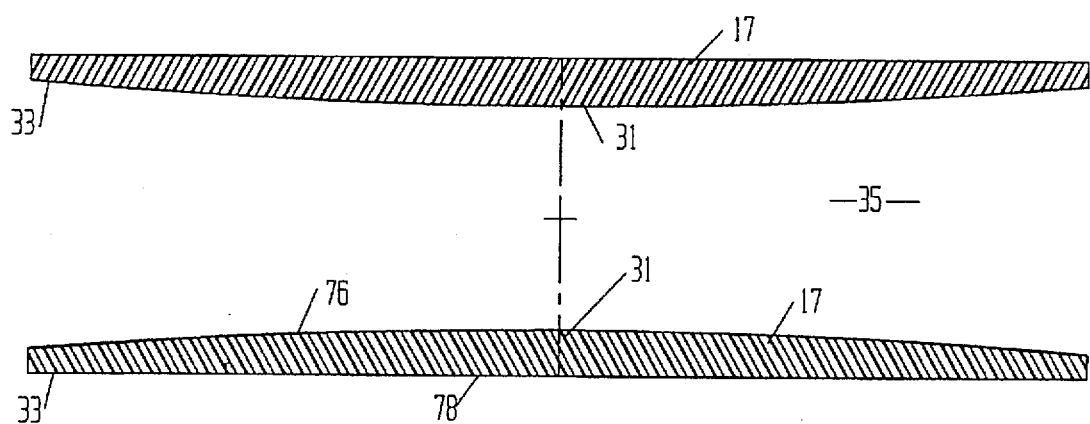
FIG. 7 shows a cross-sectional view of the membranes, in accordance with another embodiment, wherein the membranes have a parabolized thickness profile.

The membranes 17 in a preferred embodiment, are formed of a contoured, flexible, transparent material. Referring to FIG. 7 (which shows cross-sectional thickness profiles of two membranes without the edge retention structure), the thicknesses of the membranes 17 are preferentially parabolized, being the thickest at the center 31 of the membrane 17 and becoming thinner near the edge portions 33. Thus, a cross-sectional view along a diameter of the membrane, as shown in FIG. 7, shows that one surface 76 is in the shape of a parabola, while the other surface 78 is flat. However, either surface (the inner surface 76 or the outer surface 78) can be parabolized. Also, both surfaces can be parabolized. Parabolized membranes 17 provide the optimum membrane for the lens cell 11 because they cause the least spherical distortions, being less subject to spherical aberrations than membranes with other thickness profiles. Thus, to form, a spherical lens, a parabolized membrane reduces optical aberrations. Although parabolized membranes 17 are best, constant thickness membranes 17 (as shown in FIGS. 2–4) may also be used to form the lens cell 11.

In addition to thinning the membrane and treating it as a thin lens, the thinning may be proportioned to treat the membrane as a thick lens, in that the instantaneous thickness (configuration) and index of refraction of the membrane itself is used in the determination of the least aberration. This combination of treatment means that the membrane then is not deformed to a spherical shape. The parameters of the parabola are altered to make the proper optical membrane.

The membranes 17 must be flexible in order to deform in response to fluid pressures within the chamber 35. The membranes are formed of a flexible material such as polycarbonate. Preferentially, the material used to form the membranes has scratch resistant qualities. In the preferred embodiment, both membranes 17 are flexible so that the lens cell 11 is capable of the maximum range of focal power, including both positive and negative lens formations. However, both membranes 17 need not be flexible, and one membrane may be replaced by an inflexible transparent material suitable for use in a lens. Thus, the lens cell 11 need only have at least one flexible membrane.

A thick membrane not intended to deflect under fluid pressure can contain optical corrections, be replaceable, and in a circular cell be rotatable as well as subsequently with another correction and/or be positioned at another angle in the cell in this scheme.

As a further aspect of this invention, reference is made to FIGS. 2A and 2B. One of the elements of the cell is a lens 17A. The lens is parabolized so as to form a positive optical element. The lens 17A is stiff relative to the flexible membrane 17 so as not to deflect with variations in fluid volume. The lens is rotatable and replaceable. Thus, the lens can be made with an astigmatic correction, which correction can be rotated to the desired position once the lens is installed in the frame. One of the most expensive and aggravating problems of cataract surgery is the many changes of lenses needed in the long road to recovery. Traditional eyewear cannot utilize replaceable and rotatable lenses because the lens boundaries are not round and because they are made from toric (toms) sections. The invention allows the placement of the astigmatic elements 17A, 17B as positives (see FIG. 2A) or negatives (see FIG. 2B) in either the front membrane position or the rear membrane position at will. The astigmatic element can be mounted in the same place as a membrane just by removing a membrane and replacing it with the lens.

The membranes 17 are transparent so that light may pass through the lens cell 11. The material used to form the membranes 17 may be clear or transparently colored. Furthermore, the membranes 17 can be formed of a material capable of filtering light or polarizing light. A light sensitive material may also be used to form the membranes 17, where the light sensitive material darkens in response to light intensity.

The fluid 29 used in the lens cell 11 is transparent, and has a viscosity such that the fluid 25 may be pumped in and out of the cell 11 by a pump mechanism (to be explained below). Fluids having an appropriate index of refraction and viscosity suitable for use in the cell 11 are: degassed water, mineral oil, glycerin and silicone, among others. The fluid 29 may be colored for filtering and cosmetic purposes. The fluid 29 may, under special circumstances, also be a gas such as air (for example, if the surrounding external environment is not air).

The tube 27 will now be described, referring to FIG. 6. Although described with reference to FIG. 6, the tube arrangement is also utilized in the embodiment of FIG. 5. The tube 27 extends through the shells 13, 15 and ring 25A to access the chamber 35. The tube 27 is coupled to the ring 25A in a fluid-tight manner to prevent fluid 29 from escaping the cell 11 between the tube 27 and ring 25A. The tube 27 extends to the chamber 35 through a passage 82 in the ring 25A. The inside diameter of the passage 82 is smaller than the outside diameter of the tube 27. However, the walls of the tube 27 are elastic and the tube 27 may be worked through the passage 82 to access the chamber 35. The edges of the passage 82 are beveled so as to form a flared end 84 on the tube. The flare end 84 retains the tube 27 within the passage 82, thereby preventing the tube from being pulled out of the ring 25A. An adhesive can be used to also prevent separation of the tube from the ring.

The tube 27 extends through a slot 83 in the shells 13, 15. The diameter of the slot 83 is greater than the diameter of the tube 27 so that the tube 27 is not constrained by the slot 83. Outside of the shells 13, 15, the tube 27 is connected to a fluid reservoir 85 (see FIG. 8) which provides the fluid 29 necessary to adjust the focal power of the cell 11. In the case of a pair of eyewear 97, such as shown in FIG. 1, the tube extends along an earpiece 105 to the reservoir, which is contained within the earpiece.

As will be explained in more detail below, it is desirable to provide each lens cell with two tubes 27 (see FIG. 8). This allows the removal of gas from the chamber 35, which gas could interfere with the optical uniformity of the fluid 29.

Figure 8:
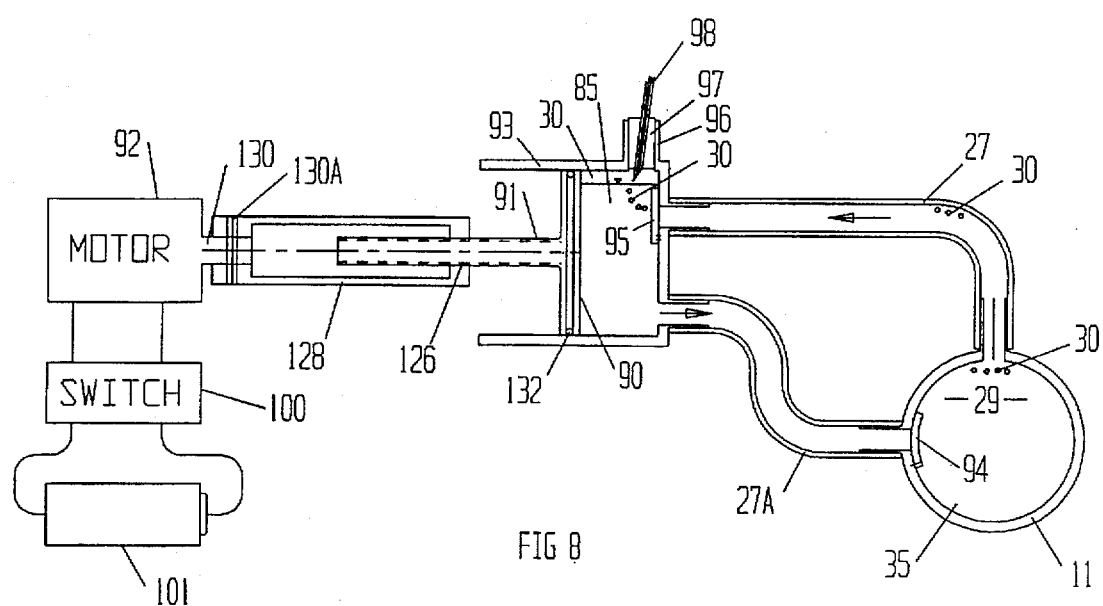
FIG. 8 is a schematic view of a piston pumping mechanism having an inflexible fluid reservoir coupled to the fluid lens cell.
Figure 8:
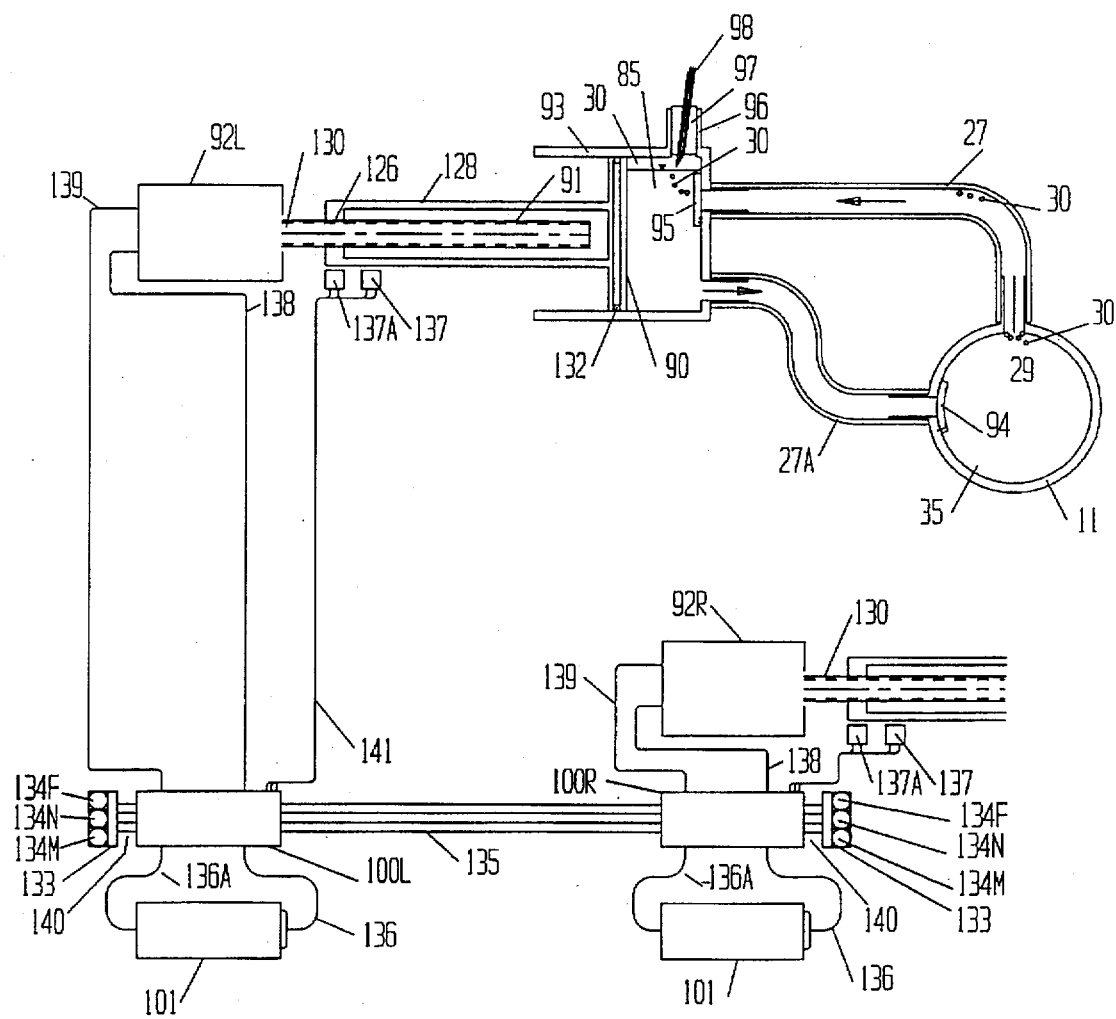
Figure 9:
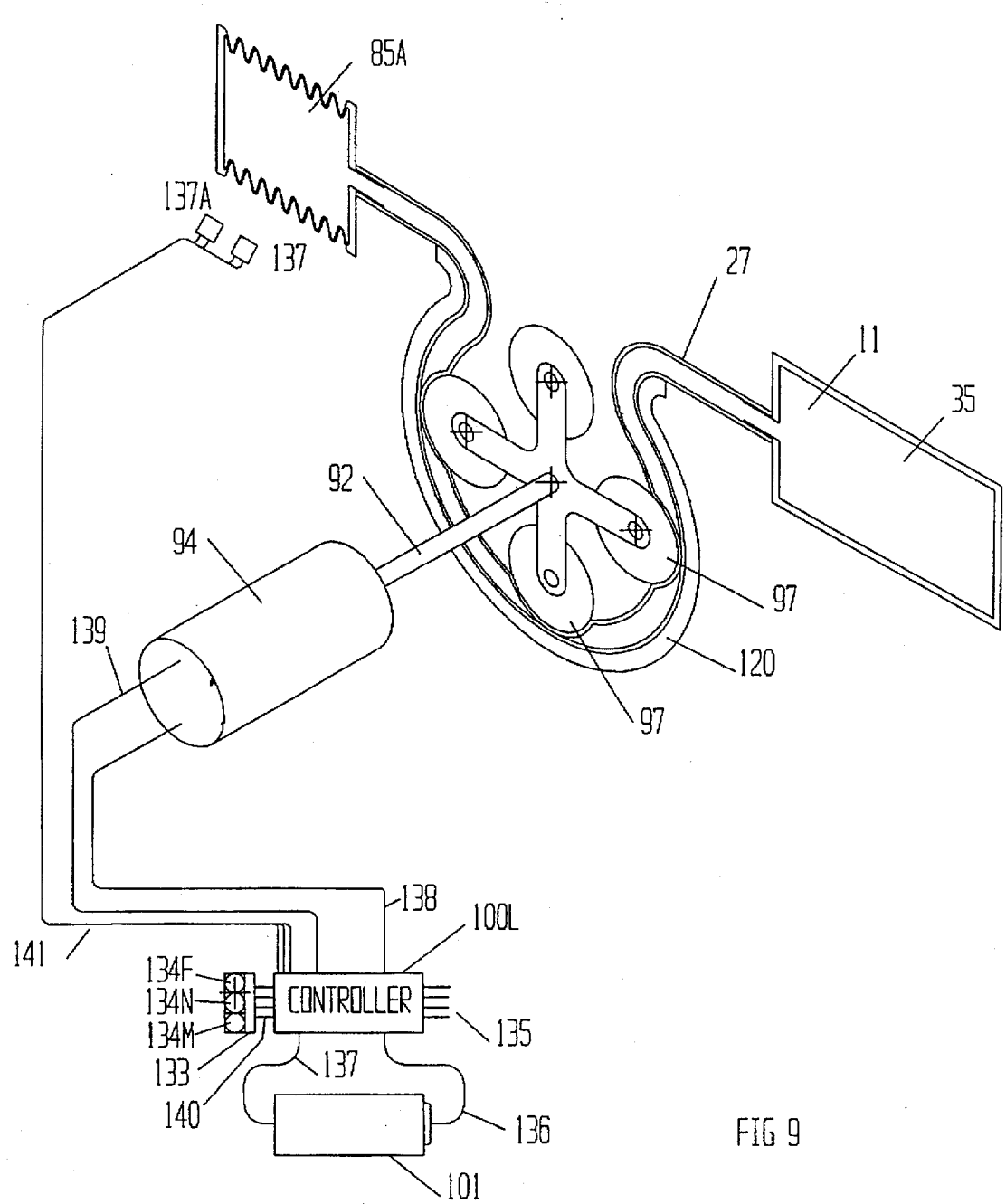
FIG. 9 is a schematic view of a peristaltic pump mechanism coupled to the fluid lens cell.

Referring to FIGS. 8 and 9, schematic views of various pumping mechanisms for transferring fluid 29 between the lens cell 11 and a fluid reservoir 85 are shown. The fluid is transferred through the tubes 27, 27A as adjustments are made in the focus of the lens cell 11. The pumping mechanism is capable of creating both positive and negative fluid pressure within the lens cell 11 so the lens cell 11 may form both a positive and a negative lens. The pumping mechanism is also capable of holding the volume of fluid 29 within the cell 11 constant over long periods of time.

As shown in FIGS. 8 and 9, there are two general type pumping mechanisms: piston pumps and peristaltic pumps. The piston pump mechanism of FIG. 8 displaces fluid 29 to and from a fluid reservoir 85 by the piston 90 acting against the fluid reservoir 85. The fluid reservoir 85 is contained in a cylinder 93. The piston head 90 has a seal 132. The piston 90 is connected to a rod 91 (a threaded rod or screw) that is driven by a nut 126 connected to a shaft extension 128 that is attached to the motor shaft 130 by way of a pin 130A. Thus, when the motor 92 is electrically connected to the battery 101 by a controller 100 (or switch), the shaft 130 turns, the nut 126 is rotated, and the screw 91 and the piston 90 are translated relative to the cylinder 93. The controller 100 is capable of reversing the current to the motor 92, and hence the direction of rotation of the nut and the direction of translation of the piston 90. The piston 90 can be connected to a thumb wheel to allow manual pumping of the fluid. Alternatively, the controller 100 could be a switch.

As shown in FIG. 8A, the shaft 130 could be threaded. Nut 126 is on the shaft 130 and is connected to the piston 90 by an extension 128. As the motor rotates the shaft 130, the nut 126, extension 128, and piston 90 move in translation.

For either version shown in FIGS. 8 and 8A, the screw and the piston are self-locking. Thus, when the motor moves the piston to a new position, and the motor is turned off, the piston is locked in place, without any energy being required to maintain the position of the piston.

In FIG. 8A, energy from battery 101 conveys along conductors 136 and 136A to controller 100L. Interface 133 includes momentary switch contacts 134F, 134N, and 134M. Signals from interface 133 are carded along conductors 140 to controller 100L. Current from controller 100L is carded along conductors 138 and 139 to motor 92L. Signals from limit switches 137 and 137A are carried in conductors 141 to controller 100L. Signals from controller 100L on the left are carried in conductors 135 to a substantially similar controller 100R on the right side of the eyewear. When contact 134F is made, the controller and motor operate to cause fluid to leave the cell 11 and go to the reservoir 85, thus focussing on objects farther away from the cell. Likewise, when contact 134N is made, fluid leaves the reservoir 85 and is pushed to the cell 11 and focus is made on objects nearer to the cell. When contact 134M is made once (a toggle), controller 100L and controller 100K act to operate both left and right side systems. When contact 134M is made once more (toggled again), controller 100L operates only the left side system. In like manner, the right side system performs to operate both sides or only the right side when 134M (on the right side) is toggled.

The system is quiescent when a task is completed requiring no energy to maintain the position of the membranes. The motors are controlled to move an increment at a time. However when the task (increment of motion) is complete, if the contact remains closed, then the motor will move another increment. The limit switches are located at the ends of a path that is traversed by the piston 90 (and its corresponding screw 91 (FIG. 8) or shaft 128 (FIG. 8A)). The limit switches 137, 137A (not drawn to scale) stop the system from moving toward the extreme at each end of the screw by turning off the motor. The controller can reverse the motion back towards the other extreme. The switches 134F, 134N, and 134M are momentary. The increment size can be varied. The controller 100L can have an input that is alternate to switches 134F, 134N, and 134M. The alternate input is connected to a range finder, wherein focus is automatic based on the range of the objects. Battery 101, contacts 134, interface 133, conductors 136, 136A, 138, 139, 141, limit switches 137, 137A, controller 100L, and motor 92L are repeated in like manner on the right side of the eyewear.

FIG. 8 illustrates the removal of gas 30 from the lens cell 11 and the fluid system. A first tube 27 is connected to the cell at a vertical high point, so as to collect any gas 30. The first tube is connected to the reservoir 85 by a one way or check valve 95. A second tube 27A is connected to the cell at a lower location and has a one way or check valve 94. At the uppermost part of the cylinder 93, there is located a port 96 with a rubber seal 97. As the piston is forced into the cylinder, fluid enters the lens 11 by the second tube 27A. The valve 95 prevents the fluid from entering the first tube 27 by way of the reservoir 85. As the piston 90 is withdrawn from the cylinder 93, fluid is withdrawn from the cell 11 through the first tube 27. The valve 94 prevents fluid from entering the second tube 27A. Gas 30 from the cell and the first tube will collect at the seal 97. A hollow, pointed needle 98 is inserted through the seal 97 and the gas 30 is withdrawn through the needle. The system is resealed by the self-sealing properties of the seal 97. Fluid can be injected into or withdrawn from the cell.

The needle 98 also allows fluid 29 to be added to or removed from the cell 11 and the reservoir 85. Thus, the lens membranes 17 can be deflected not only by operating the piston, but also by adding or removing fluid by the needle 98.

The peristaltic pump mechanism of FIG. 9 displaces fluid 29 to and from the fluid reservoir 85A and the lens cell 11 by means of one or more rollers 97 which compress the tube 27, thereby forcing the fluid 29 to move through the tube 27. The tube 27 is interposed between the rollers 97 and a stop 98 to allow the tube to be compressed. In FIG. 9, as the rollers 99 rotate about a shaft 92, the rollers traverse a length of the tube 27, compressing it. As the rollers 97 move towards the lens cell 11 along the tube, the fluid 29 in the tube 27 is pushed into the cell. As the rollers 97 are moved away from the lens cell 11, fluid 29 is withdrawn from the cell through the tube. The reservoir 85A is a bellows container to allow the fluid to be maintained under pressure with varying volumes.

The pumping mechanisms may be manually operated or may be designed to be operated by motor drives. In FIGS. 8 and 9, there are shown motorized drives. In FIG. 9, a motor 94 rotates the shaft 92 which in turn rotates the rollers 97.

The pumping motor 94 of FIG. 9 may be electrically controlled. Electric control is provided by momentarily closing one of three switch closures to operate a three position switch 100 (OFF, FORWARD (for positive membrane displacement shown in FIG. 3), or REVERSE (for negative membrane displacement shown in FIG. 4)). The switch 100 is connected to a battery 101.

The flexible boundary fluid lens cell 11 of the present invention is particularly useful when two cells 11 are incorporated into eyewear 97 (FIG. 1). Eyewear 97 incorporating the cell 11 are capable of focusing on objects at all distances, and are especially useful to compensate for loss of accommodation (the eye's ability to change focus on objects at different ranges, a human faculty that begins to diminish starting at about age 40). Eyewear 97 having the flexible boundary fluid lens cell 11 also provide a large field of view that is free of deleterious field distortions. Flexible boundary fluid lens cells 11 that fit the human face are adequately free of field distortions about 25 degrees off the central optic axis, where humans normally turn their heads to view objects 15 degrees off axis.

Figure 10:
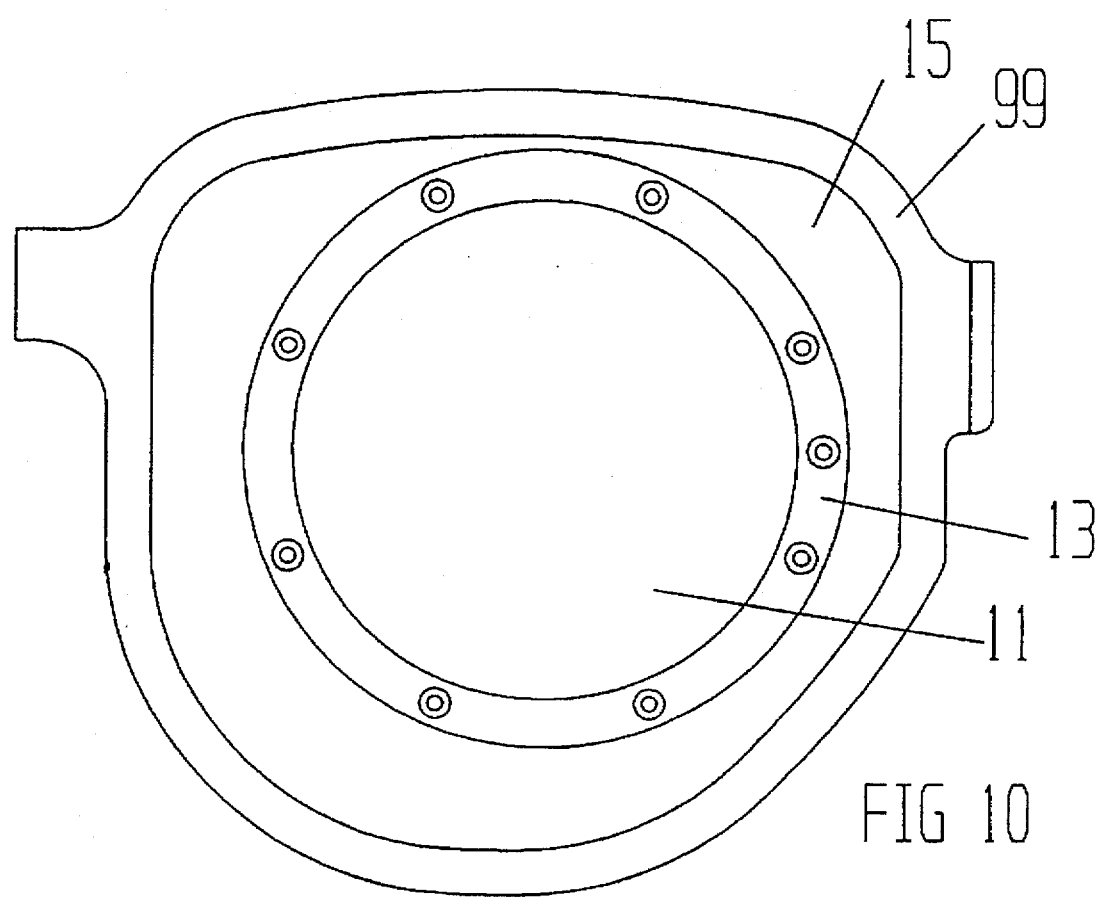
FIG. 10 is a front view of a conventional eyeglass frame incorporating the fluid lens cell therein.

As shown in FIG. 10, in order to mount the cells 11 in conventional eyewear frames 99, the outer shell 15 of the cell 11 is edge ground and edge beveled, then inserted into the eyewear frames 99. To use the cells 11 themselves as a frame, the outer shells 15 of the cells 11 are coupled by a nose bridge 101 (FIG. 1), and each outer shell 15 is equipped with earpiece hinge anchors 103. Earpieces 105 are attached to the outer shell at the earpiece hinge anchors 103. In both the configurations above, the cells 11 are independently operative so that each cell 11 may be focused individually. The tubes 27 may be extended from the cells 11 along the earpieces 105. The fluid reservoirs 85 and pump mechanisms 87 for each cell 11 may be located within the earpieces 105.

As shown in FIGS. 11A–11K, the periphery of the membranes 17 may be shaped to correct various visual deficiencies. Circular, constant radius membranes 107 (FIG. 11A) may be used to correct nearsightedness, farsightedness, and loss of accommodation. Elliptical membranes 109 (FIG. 11B) may be used to correct simple astigmatism as well as nearsightedness, farsightedness and loss of accommodation. Other non-uniform radius type membranes may be used to correct multi-lobed astigmatism in addition to the visual deficiencies corrected by elliptical membranes. Non-uniform radius type cells include, but are not limited to, round cornered equilateral triangles 111 (FIG. 11C) and non-equilateral triangles (FIG. 11D), round cornered rectangles 114, 117 (FIGS. 11E and 11F), quadrilaterals 115 (FIG. 11F), 119 (FIG. 11H), and 121 (FIG. 11I), and pentagons 123 (FIG. 11D and 125 (FIG. 11K). The shells 13, 15 are shaped according to the peripheral membrane shape.

The foregoing disclosure and the showings made in the drawings are merely illustrative of the principles of this invention and are not to be interpreted in a limiting sense.

I claim:

1. A lens cell, comprising:
   a) two transparent membranes, each of said membranes having an edge portion that extends around a periphery of said respective membrane, each of said edge portions having an exterior portion and an interior portion, with at least one of said membranes being flexible;
   b) a ring located between said interior portions of said edge portions of said membranes, said ring extending around the peripheries of said membranes such that said membranes are spaced apart and form a cavity therebetween, said cavity being filled with a transparent fluid;
   c) a frame having a channel therein, said membrane edge portions being located within said channel, said channel having a lip that is adjacent to said exterior portion of said flexible membrane edge portion, said lip having an inside surface that is spaced apart from an end surface of said ring so as to form a gap;
   d) said edge portion of said flexible membrane being clamped within a portion of said gap between said lip inside surface and said ring end surface, wherein said edge portion of said flexible membrane pivots freely between said lip and said ring as said flexible membrane flexes due to changes in the fluid in said cavity.

2. The lens cell of claim 1, further comprising a seal that is interposed between said ring end surface and said interior portion of said edge portion of said flexible membrane.

3. The lens cell of claim 2, wherein said seal has a first projection that contacts said ring end surface.

4. The lens call of claim 2, wherein said ring has a first projection that contacts said seal.

5. The lens cell of claim 1, further comprising a second projection that is interposed between said lip and said exterior portion of said flexible membrane edge portion, said second projection is coupled to said lip so as to form said lip inside surface.

6. The lens cell of claim 1, wherein said flexible membrane has a circular periphery.

7. The lens cell of claim 1, wherein said flexible membrane has a non-circular periphery.

8. The lens cell of claim 1, wherein both of said membranes are flexible, said ring being interposed between said respective interior portions of said edge portions of said membranes, said lip being a first lip, said channel having a second lip, with said edge portion of one said membranes being clamped between said ring and said first lip and said edge portion of said other membrane being clamped between said ring and said second lip.

9. The lens cell of claim 1, further comprising a port located in said ring, said port communicating with a reservoir for said fluid and also communicating with said cavity.

10. The lens cell of claim 9, wherein said reservoir comprises a piston located within a cylinder, said cylinder containing said reservoir of said fluid.

11. The lens cell of claim 10, further comprising a motor for moving said piston in and out of said cylinder.

12. The lens cell of claim 11 further comprising:
   a) a first switch connected to said motor and for causing said motor to move said piston into said cylinder;
   b) a second switch connected to said motor and for causing said motor to move said piston out of said cylinder.

13. The lens cell of claim 11 further comprising limit switches located at ends of a path traversed by the piston, said limit switches being connected to said motor so as to turn off said motor when said piston reaches the ends.

14. The lens cell of claim 9, wherein:
   a) said reservoir comprises a flexible tube;
   b) a roller is in contact with said tube, said roller and tube forming a peristaltic pump.

15. The lens cell of claim 9, further comprising a bias valve having an interior portion and an exterior portion, said interior portion communicating with said fluid in said reservoir and said exterior portion communicating with an exterior of said lens cell.

16. The lens cell of claim 9, wherein said reservoir comprises first and second channels, each of said first and second channels having first and second ends, said first end of each of said first and second channels being connected to said lens cell so as to allow communication between said first and second channels and said cell cavity, said second end of said first channel communicating with said second end of said second channel, said first channel having a first one way valve that allows said fluid to flow from said first channel first end to said first channel second end, said second channel having a second one-way valve that allows said fluid to flow from said second channel second end to said second channel first end.

17. The lens cell of claim 16, further comprising a bias value having an interior portion and an exterior portion, said interior portion communicating with said fluid in said reservoir and said exterior portion communicating with an exterior of said lens cell, said interior portion communicating with said first channel.

18. The lens cells of claim 1 wherein said flexible membrane has a cross-sectional thickness profile between first and second surfaces, said first surface being parabolic.

19. The lens cell of claim 1 wherein said fluid is colored.

20. The lens cell of claim 1 wherein said fluid is a gas.

21. The lens cell of claim 1 wherein said other of said membranes is stiff and is a positive optical element.

22. The lens cell of claim 1 wherein said other of said membranes is stiff and is a negative optical element.

23. The lens cell of claim 1 wherein said other of said membranes is stiff and contains an astigmatic correction, said other of said membranes being rotatable and replaceable relative to said frame.

24. The lens cell of claim 1, further comprising:
   a) said cavity having a port that communicates to a reservoir, said reservoir containing a portion of said fluid;
   b) said reservoir having a piston head therein for moving said fluid in and out of said reservoir;
   c) a hollow shaft having first and second ends, said first end of said shaft being coupled to said piston head and said second end of said shaft having a nut;
   d) said nut receiving a rotatable screw, wherein when said screw rotates said hollow shaft and said piston head move relative to said reservoir so as to move said fluid in or out of said reservoir.

25. The lens cell of claim 1, further comprising:
   a) said cavity having a port that communicates to a reservoir, said reservoir containing a portion of said fluid;
   b) said reservoir having a piston head therein for moving said fluid in and out of said reservoir;
   c) a rotatable hollow shaft having first and second ends, said first end of said shaft having a nut;
   d) a screw having first and second ends, said screw first end being connected to said piston head, said screw being received by said nut and said hollow shaft, wherein when said hollow shaft rotates said screw end said piston head move relative to said reservoir so as to move said fluid in or out of said reservoir.

26. A method of changing optical properties of a lens cell, said cell comprising two transparent membranes, each of said membranes having an edge portion that extends around a periphery of said respective membrane, each of said edge portions having an exterior portion and an interior portion, with at least one of membranes being flexible; a ring located between said interior portions of said edge portions of said membranes, said ring extending around the peripheries of said membranes such that said membranes are spaced apart and form a cavity therebetween, said cavity being filled with a transparent fluid; a frame having a therein, said membrane edge portions being located within said channel, said channel having a lip that is adjacent to said exterior portion of said flexible membrane edge portion, said lip having an inside surface that is spaced apart from an end surface of said ring so as to form a gap; said edge portion of said flexible membrane being clamped within a portion of said gap between said lip inside surface and said ring end surface, wherein said edge portion of said flexible membrane pivots freely between said lip and said ring as said flexible membrane flexes due to changes in the fluid in said cavity, comprising the steps of:

a) providing a channel for said fluid from one location of said cavity to a location that is outside of said cell and then to another location of said cavity;

b) providing a one-way valve in said channel;

c) changing the amount of said fluid in said channel and said cell by adding or removing said fluid from said channel wherein said flexible membrane flexes in response to said fluid change.

27. The method of claim 26, wherein said step of changing the amount of said fluid in said channel and said cell by adding or removing said fluid from said channel, further comprises the step of inserting a hollow needle into said channel and adding or removing said fluid from said channel through the needle.

28. The method of claim. 26, wherein said step of changing the amount of said fluid in said channel and said cell by adding or removing said fluid from said channel, further comprises the step of removing gas from said channel.

29. An optical system, comprising:

a) a first lens cell;

b) a second lens cell;

c) each of said first and said second lens cells comprising:

i) two transparent membranes, each of said membranes having an edge portion .that extends around a periphery of said respective membrane, each of said edge portions having an exterior portion and an interior portion, with at least one of said membranes being flexible;

ii) a ring located between said interior portions of said edge portions of said membranes, said ring extending around the peripheries of said membranes such that said membranes are spaced apart and form a cavity therebetween, said cavity being filled with a transparent fluid;

iii) a frame having a channel therein, said membrane edge portions being located within said channel, said channel having a lip that is adjacent to said exterior portion of said flexible membrane edge portion, said lip having an inside surface that is spaced apart from an end surface of said ring so as to form a gap;

iv) said edge portion of said flexible membrane being clamped within a portion of said gap between said lip inside surface and said ring end surface, wherein said edge portion of said flexible membrane pivots freely between said lip and said ring as said flexible membrane flexes due to changes in the fluid in said cavity;

v) a port located in said ring, said port communicating with a reservoir for said fluid and also communicating with said cavity;

vi) said reservoir comprises a piston located within a cylinder, said cylinder containing said reservoir of said fluid;

vii) a motor for moving said piston in and out of said cylinder;

d) a first controller being connected to said first lens cell motor so as to operate said first lens cell motor and move said first lens cell piston in and out of said first lens cell cylinder;

e) a second controller being connected to said second lens cell motor so as to operate said second lens cell motor and move said second lens cell piston in and out of said second lens cell cylinder.

30. The optical system of claim 29 wherein the first controller is quiescent when the first lens cell piston is not moving within the first lens cell cylinder and the second controller is quiescent when the second lens cell piston is not moving within the second lens cell cylinder.

31. The optical system of claim 29 further comprising:

a) a communications link between the first controller and the second controller;

b) the first controller having a first mode and a second mode, wherein in the first mode, the first controller controls only the first lens cell motor, and in the second mode, the first controller controls the first lens cell motor and communicates with the second controller over the communications link so that the second lens cell piston is operated by the second lens cell motor in a manner that is similar to the operation of the first cell portion.

32. The optical system of claim 31 further comprising a switch connected to the first controller for changing the first controller between the first and second modes.

* * * * *